US012218472B2

(12) United States Patent
Gebhardt

(10) Patent No.: US 12,218,472 B2
(45) Date of Patent: *Feb. 4, 2025

(54) CONNECTION ARRANGEMENT, CONNECTION CLAMP AND ELECTRONIC DEVICE

(71) Applicant: Phoenix Contact GmbH & Co. KG, Blomberg (DE)

(72) Inventor: Martin Gebhardt, Lage (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 358 days.

This patent is subject to a terminal disclaimer.

(21) Appl. No.: 17/777,298

(22) PCT Filed: Nov. 10, 2020

(86) PCT No.: PCT/EP2020/081551

§ 371 (c)(1),
(2) Date: May 17, 2022

(87) PCT Pub. No.: WO2021/099173

PCT Pub. Date: May 27, 2021

(65) Prior Publication Data

US 2022/0407244 A1 Dec. 22, 2022

(30) Foreign Application Priority Data

Nov. 19, 2019 (DE) .................... 10 2019 131 145.4

(51) Int. Cl.
*H01R 4/48* (2006.01)

(52) U.S. Cl.
CPC ......... *H01R 4/4833* (2023.08); *H01R 4/4835* (2023.08); *H01R 4/4821* (2023.08)

(58) Field of Classification Search
CPC .............. H01R 4/48365; H01R 4/4835; H01R 4/48455; H01R 4/4816
See application file for complete search history.

(56) References Cited

U.S. PATENT DOCUMENTS 7,115,001 B1 10/2006 Brockman et al.
10,367,272 B2 * 7/2019 Witte ................ H01R 4/48365
(Continued)

FOREIGN PATENT DOCUMENTS

DE 1213024 B * 3/1966
DE 202006009460 U1 3/2007
(Continued)

*Primary Examiner* — Renee S Luebke
*Assistant Examiner* — Paul D Baillargeon
(74) *Attorney, Agent, or Firm* — LEYDIG, VOIT & MAYER, LTD.

(57) ABSTRACT

A connection arrangement for connecting an electrical conductor includes: a busbar; a clamping spring, which has a retaining leg and a clamping leg, the clamping leg being transferable into a clamping position and into a release position; a conductor connection space formed between a section of the busbar and of the clamping leg of the clamping spring; a displaceably arranged guide element, which is in operative connection with the clamping leg of the clamping spring, the clamping leg being holdable in the release position by the guide element; and an actuating element, by which the guide element is displaceable in order to transfer the clamping leg of the clamping spring from the clamping position into the release position. The clamping spring is arranged between the section of the busbar and the actuating element.

18 Claims, 7 Drawing Sheets

(56) References Cited

U.S. PATENT DOCUMENTS

| | | | |
|---|---|---|---|
| 2007/0099479 | A1 | 5/2007 | Holterhoff et al. |
| 2019/0190168 | A1 | 6/2019 | Witte et al. |
| 2021/0005783 | A1 | 2/2021 | Fehling et al. |

FOREIGN PATENT DOCUMENTS

| | | | |
|---|---|---|---|
| DE | 202013100740 | U1 | 3/2013 |
| DE | 202014103797 | U1 | 11/2014 |
| DE | 202016104971 | U1 | 12/2017 |
| DE | 102016115601 | A1 | 3/2018 |
| DE | 102017117459 | A1 | 2/2019 |
| DE | 202019101246 | U1 | 6/2019 |
| EP | 1555723 | A1 | 7/2005 |
| JP | H0482484 | A | 3/1992 |
| JP | H0645260 | U | 6/1994 |

* cited by examiner

CONNECTION ARRANGEMENT, CONNECTION CLAMP AND ELECTRONIC DEVICE

CROSS-REFERENCE TO PRIOR APPLICATIONS

This application is a U.S. National Phase application under 35 U.S.C. § 371 of International Application No. PCT/EP2020/081551, filed on Nov. 10, 2020, and claims benefit to German Patent Application No. DE 10 2019 131 145.4, filed on Nov. 19, 2019. The International Application was published in German on May 27, 2021 as WO/2021/099173 under PCT Article 21(2).

FIELD

The invention relates to a connection arrangement for connecting an electrical conductor. The invention further relates to a clamp terminal and an electronic device.

BACKGROUND

Such connection arrangements usually have a clamping spring designed as a leg spring, which clamping spring has a retaining leg and a clamping leg, wherein a conductor inserted into the connection arrangement can be clamped against the busbar by means of the clamping leg of the clamping spring. If, in particular, flexible conductors are clamped, the clamping spring must already be moved, before insertion of the conductor, into a release position by means of an actuating element and thus be actuated in order to pivot the clamping spring or the clamping leg away from the busbar so that the conductor can be inserted into the intermediate space between the busbar and the clamping spring. Only in the case of rigid and thus robust conductors can the conductor apply sufficient force to the clamping spring or the clamping leg of the clamping spring to be able to pivot the clamping leg away from the busbar without the actuating element having to be actuated for this purpose by a user. With flexible conductors, the user must first pivot the clamping spring away from the busbar by actuating the actuating element so that the flexible conductor can be inserted. Here, the actuating element usually presses against the clamping leg of the clamping spring in order to pivot the clamping leg away from the busbar and release the conductor connection space.

SUMMARY

In an embodiment, the present invention provides a connection arrangement for connecting an electrical conductor, comprising: a busbar; a clamping spring, which has a retaining leg and a clamping leg, the clamping leg being transferable into a clamping position and into a release position; a conductor connection space formed between a section of the busbar and of the clamping leg of the clamping spring; a displaceably arranged guide element, which is in operative connection with the clamping leg of the clamping spring, the clamping leg being holdable in the release position by the guide element; and an actuating element, by which the guide element is displaceable in order to transfer the clamping leg of the clamping spring from the clamping position into the release position, wherein the clamping spring is arranged between the section of the busbar and the actuating element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
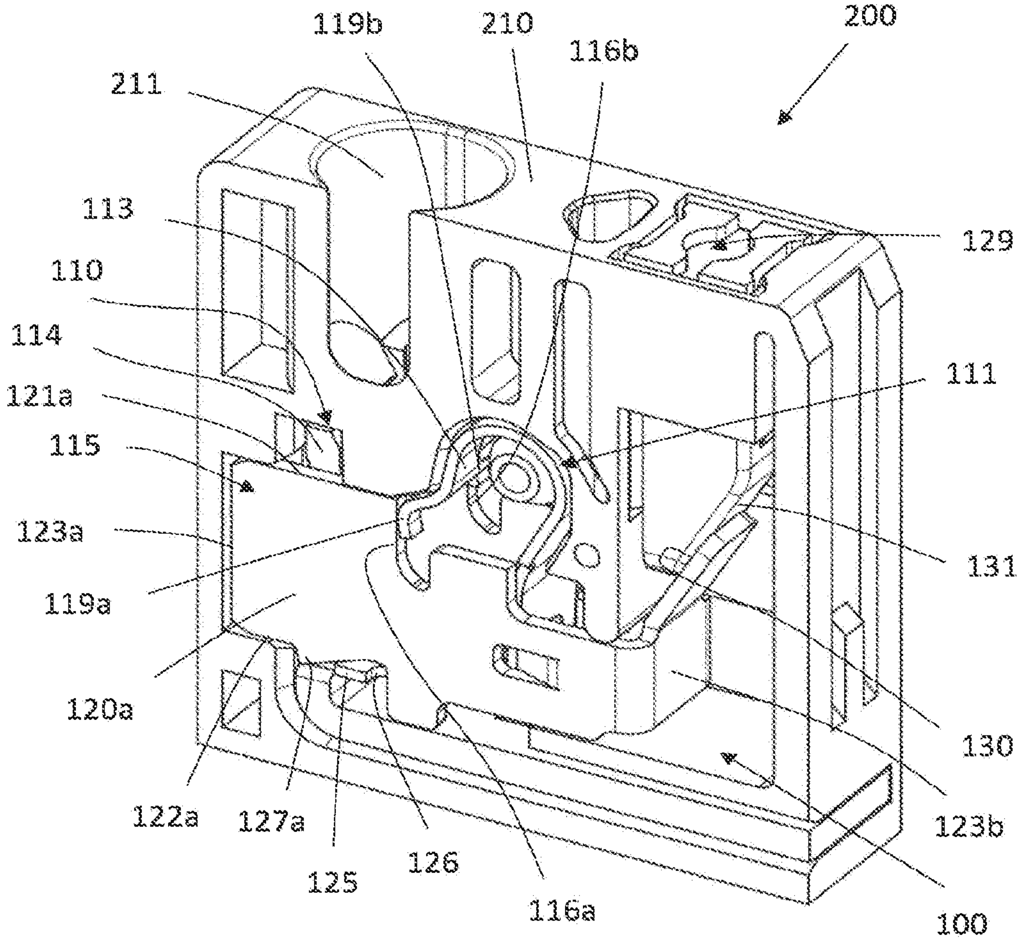
FIG. 1 is a schematic representation of a clamp terminal with a connection arrangement according to the invention with the clamping leg of the clamping spring in a clamping position.

In an embodiment, the present invention provides a connection arrangement along with a clamp terminal and an electronic device, with which handling while conductors are being connected can be simplified for a user.

The connection arrangement according to the invention has a busbar, a clamping spring, which has a retaining leg and a clamping leg, wherein the clamping leg is transferable into a clamping position and into a release position, a conductor connection space formed between a section of the busbar and of the clamping leg of the clamping spring, a displaceably arranged guide element, which is in operative connection with the clamping leg of the clamping spring, wherein the clamping leg can be held in the release position by means of the guide element, and an actuating element, by means of which the guide element is displaceable for transferring the clamping leg of the clamping spring from the clamping position into the release position. Here, the clamping spring is arranged between the section of the busbar and the actuating element.

The clamping spring is preferably designed as a leg spring which has a retaining leg and a clamping leg designed to be pivotable relative to the retaining leg. By means of a pivoting movement of the clamping leg, the clamping leg can be transferred into a release position, in which the clamping leg is arranged at a distance from the busbar and a conductor that is to be connected can be guided into or out of a conductor connection space formed thereby between the busbar and the clamping leg, and into a clamping position, in which the clamping leg can rest against the busbar or against the connected conductor in order to clamp the conductor against the busbar. The connection arrangement has a guide element which is mounted in particular horizontally displaceably and is preferably operatively connected to the clamping spring both in the release position and in the clamping position of the clamping leg of the clamping spring, which means that the clamping leg, due to the operative connection with the guide element, follows the displacement movement and thus the position of the guide element. The guide element holds the clamping leg in the release position against its spring force in that the guide element presses against the clamping leg. The guide element can take the form of a slide element. The connection arrangement furthermore has an actuating element, by means of which the guide element can be displaced in order to transfer the clamping leg of the clamping spring from the clamping position into the release position. The actuating element can preferably be designed in such a way that it exerts a compressive force on the guide element in order to displace it against the spring force of the clamping leg of the clamping spring in such a way until the clamping leg reaches the release position. In this release position, the clamping leg can be held by the actuating element indirectly via the guide element. Due to the displacement movement of the guide element, the guide element can apply a tensile force to the clamping leg of the clamping spring in order to transfer the clamping leg from the clamping position into the release position. The actuating element is preferably movable in a direction which is oriented transversely to the direction of the displacement movement of the guide element. The actuating element is preferably movable purely translationally. The direction of the movement of the actuating element is preferably oriented in parallel to the insertion direction of the conductor into the conductor connection space. The actuating element is arranged in such a way that it does not enter the conductor connection space so that an interaction of the actuating element with the connected conductor can be prevented. On the other hand, the clamping spring, the busbar and the actuating element are arranged in such a way that the clamping spring is arranged between the actuating element and the section of the busbar against which a conductor to be connected is clamped. As a result, handling of the connection arrangement can be significantly simplified for a user when an electrical conductor is being connected, since the actuating element is positioned away from the conductor connection space and the insertion of a conductor is thus not hindered by the actuation of the actuating element.

The guide element can have a slide face along which the actuating element can be guided. At the slide face, the actuating element can rest flat against the guide element. By means of the slide face, the actuating element can slide along the guide element and thus transfer a compressive force to the guide element in order to move the guide element.

The guide element can have two longitudinal side walls and two end walls arranged at right angles to the two longitudinal side walls, wherein the slide face can be arranged on one of the two end walls of the guide element. The guide element can have a rectangular design due to the two longitudinal side walls and the two end walls arranged at right angles thereto. The guide element can form a frame that, in particular, can enclose or encompass the clamping spring and the section of the busbar against which the conductor can be clamped. The slide face is preferably oriented in such a way that the slide face extends transversely to the two longitudinal side walls. The slide face can form an extension of the end wall on which the slide face is arranged.

The slide face can form an inclined surface which can interact with an inclined surface formed on the actuating element. If the slide face is designed as an inclined surface, it preferably has one inclination. The surface of the actuating element resting against the slide face is then also preferably designed as an inclined surface which is formed at an incline to the longitudinal extension of the actuating element which extends in the movement direction of the actuating element. The inclination of the slide face and the inclination of the surface of the actuating element can be formed at an angle between 30° and 50° to the actuation direction of the actuating element. If both the slide face and the surface of the actuating element which slides along the slide face are designed as an inclined surface, it is possible for the perpendicular movement direction of the actuating element to be converted or be transferred into a horizontal displacement movement of the guide element when the actuating element slides along the slide face.

Starting from an edge face of one of the two end walls, the slide face can extend in the direction of the actuating element. The slide face can thus form an extension of one of the two end walls in the direction of the actuating element.

The guide element is preferably displaceable in such a way that a displacement movement of the guide element transversely to an insertion direction of the conductor to be connected into the conductor connection space can take place. In this way, a particularly compact design is possible, as a result of which the connection arrangement can be characterized by a reduced installation space.

In order to be able to form an operative connection between the guide element and the clamping leg of the clamping spring, it can be provided that the guide element has at least one spring contact edge against which the clamping leg can rest. The spring contact edge can be designed in such a way that both in the release position and in the clamping position, the clamping leg or at least a part of the clamping leg can rest against the spring contact edge. The spring contact edge can be formed, for example, on a shoulder of the guide element.

In order to be able to achieve a uniform guidance of the guide element and of the clamping leg of the clamping spring, two such spring contact edges can be formed on the guide element so that the clamping leg can be guided on the guide element via two such spring contact edges. The two spring contact edges preferably extend in parallel to one another on the guide element.

With such a design, it is possible for the clamping leg to have two slide sections each arranged laterally in relation to a main section having a clamping edge, and for the guide element to have two spring contact edges arranged at a distance from one another, wherein a first slide section can rest against a first spring contact edge and a second slide section can rest against a second spring contact edge. The two slide sections preferably each have a shorter length than the main section of the clamping leg. The main section and the two slide sections preferably extend in parallel to one another. The two slide sections are preferably each curved so that they can each form a skid which can slide along a respective spring contact edge. However, the main section is preferably straight.

The two longitudinal side walls of the guide element can be designed to be so long in the insertion direction of the conductor that the two longitudinal side walls can delimit the conductor connection space on a first side and on a second side opposite the first side. The guide element can thus also form a guide for the conductor to be connected when the latter is being inserted into the conductor connection space. The two longitudinal side walls can prevent incorrect insertion of the conductor. The conductor connection space can thus be delimited on two of its sides by the guide element and on its other two sides by the busbar and by the clamping leg of the clamping spring. One of the two spring contact edges can be formed on each of the two longitudinal side walls.

In order to be able to achieve a stable mounting of the clamping spring, the clamping spring can be supported via its retaining leg on the busbar. For this purpose, the clamping spring can rest flat with a section of the retaining leg against a part of the busbar, for example. In addition, the retaining leg can also have an opening through which the part of the busbar can pass, so that the retaining leg can be attached to the busbar. The part of the busbar against which the retaining leg of the clamping spring is supported is preferably arranged opposite the section of the busbar against which a conductor can be clamped. This part of the busbar can form an end section of the busbar.

The connection arrangement can also comprise a release element, which, in the release position of the clamping spring, can be in engagement with the guide element. When the conductor to be connected is being inserted into the conductor connection space, the release element can be actuated thereby in such a way that the release element comes out of engagement with the guide element and the guide element can be displaced by a spring force of the clamping leg in such a way that the clamping leg can be transferred into the clamping position in order to clamp the conductor against the busbar. By providing a release element, a flexible conductor in particular can be connected without actuation of the actuating element and can be clamped against the busbar. In order to be able to hold the guide element in the release position, the guide element can be in engagement with the release element in the release position of the clamping leg of the clamping spring. When the release element is in engagement with the guide element, a displacement movement of the guide element is not possible or is stopped. Via an operative connection or coupling of the release element to the guide element and of the guide element to the clamping leg of the clamping spring in the release position of the clamping leg, the clamping leg can be held in this release position without the assistance of the actuating element, so that in particular a flexible conductor can be inserted into the thus free conductor connection space between the busbar and the clamping spring. The release element can have a pressure surface which faces in the direction of the conductor connection space and can be arranged flush with an insertion region of the conductor in the connection arrangement or flush with the conductor connection space, so that the conductor rests against the pressure surface of the release element during insertion into the connection arrangement, as a result of which a compressive force can be applied by the conductor to the release element. By applying a compressive force to the pressure surface by means of the conductor and thus to the release element, the release element can, for example, be brought into a pivoting movement or tilting movement in the direction of the insertion direction of the conductor so that the release element can be pivoted or tilted away from the guide element in the insertion direction of the conductor. As a result of the pivoting movement of the release element, the release element can be brought out of engagement with the guide element so that the guide element is freely displaceable again and the guide element can thereby be displaced solely by the spring force of the clamping leg, without manual assistance, in such a way that the clamping leg can be transferred from the release position into the clamping position. By means of this special mechanism, a flexible conductor can be connected in a particularly simple manner solely by the insertion movement of the conductor, without a user needing to actuate further elements, such as an actuating element, in order to release the clamping spring and transfer it from the release position into the clamping position. This facilitates the handling of the connection arrangement and saves time when connecting a conductor. The release element preferably extends over the region between the clamping spring and the section of the busbar against which a conductor can be clamped, so that the release element can delimit the conductor connection space to one side.

In order to release the release element from the guide element by means of the conductor inserted into the conductor connection space and to thus be able to bring it out of engagement with the guide element, the release element can be mounted so as to be tiltable relative to the guide element. The release element can thus be designed like a rocker. If the conductor to be connected is pressed against the release element, the release element can tilt in the insertion direction of the conductor in order to come out of engagement with the guide element and thus release the guide element so that the latter is again freely displaceable.

In order to be able to form an engagement of the release element with the guide element in the release position of the clamping leg of the clamping spring, the release element can have at least one undercut with which at least one latching lug of the guide element can latch when the clamping leg of the clamping spring is in the release position. As a result, a latching connection can be formed between the guide element and the release element when the clamping leg of the clamping spring is in the release position. The release element preferably has two undercuts and the guide element preferably has two latching lugs so that a double-acting latching can be formed between the guide element and the release element. If two undercuts are provided, they are preferably formed on two side faces of the release element running in parallel to one another.

The release element can be connected to the retaining leg of the clamping spring. The release element is preferably connected to the retaining leg in such a way that the release element can be pivoted relative to the retaining leg. The pivot axis is then preferably formed in the region of the connection of the release element to the retaining leg of the clamping spring. The connection between the retaining leg and the release element can preferably be designed in such a way that the retaining leg is formed integrally with the release element. However, it is also possible for the release element to be an element or component formed separately from the clamping spring, the busbar and the guide element.

The object according to the invention is also achieved by means of a clamp terminal, in particular a terminal block, which has at least one connection arrangement formed and developed as described above. The clamp terminal can be arranged, for example, on a circuit board. If the clamp terminal is designed as a terminal block, it can be arranged on a mounting rail.

It is also possible for a clamp terminal arrangement to be provided, which can have a plurality of clamp terminals arranged in a row, each of which can have at least one connection arrangement formed and developed as described above.

In addition, a plug-in connector can also be provided, which can have one or more of the above-described formed and developed connection arrangements.

In addition, the object according to the invention can be achieved by means of an electronic device, which can have at least one connection arrangement formed and developed as described above and/or at least one clamp terminal formed and developed as described above.

FIG. 1 shows a clamp terminal 200 with a housing 210, which can be formed from an insulating material, wherein a connection arrangement 100 for connecting a conductor is arranged or accommodated in the housing 210.

Figure 2:
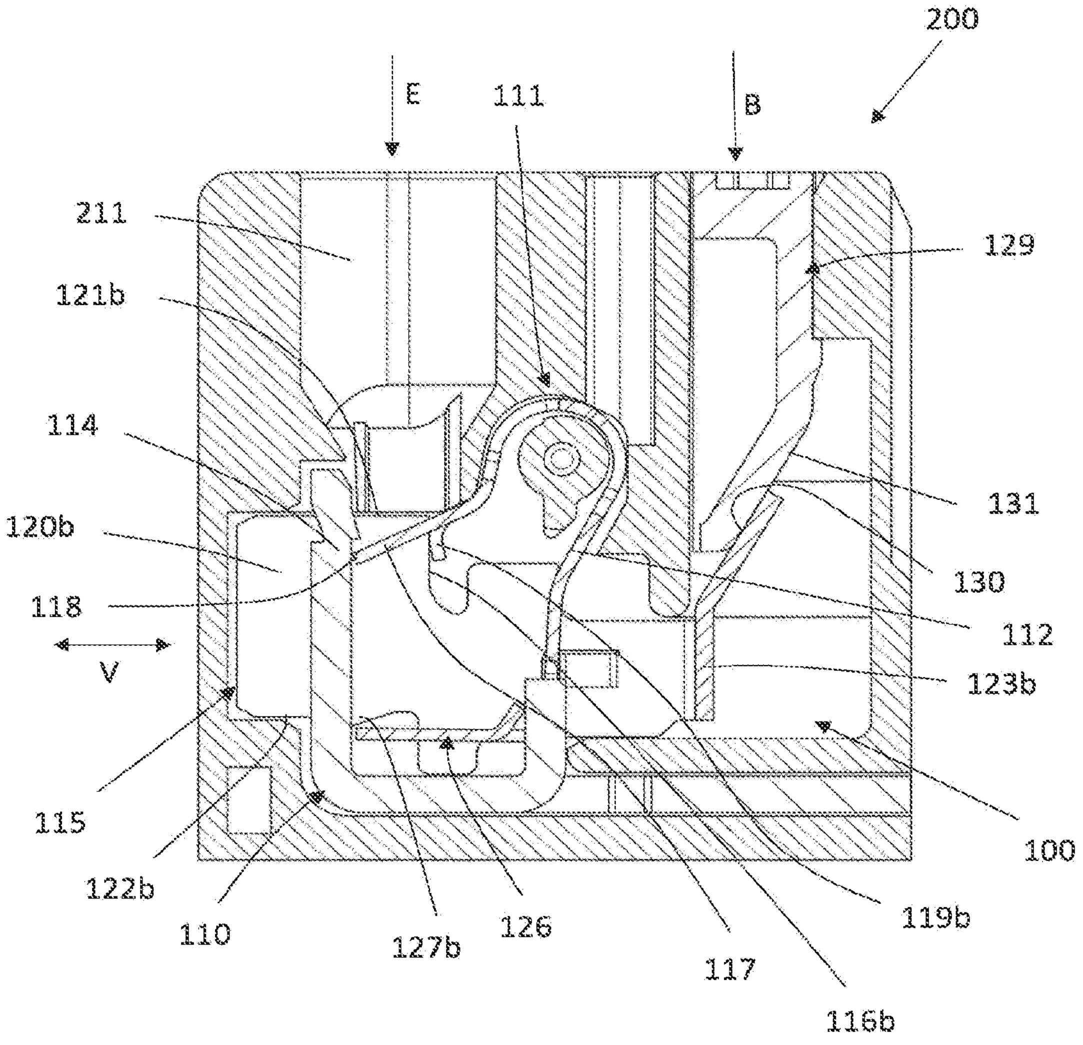
FIG. 2 is a schematic sectional representation of the clamp terminal shown in FIG. 1 with the connection arrangement according to the invention with the clamping leg of the clamping spring in the clamping position.
Figure 3:
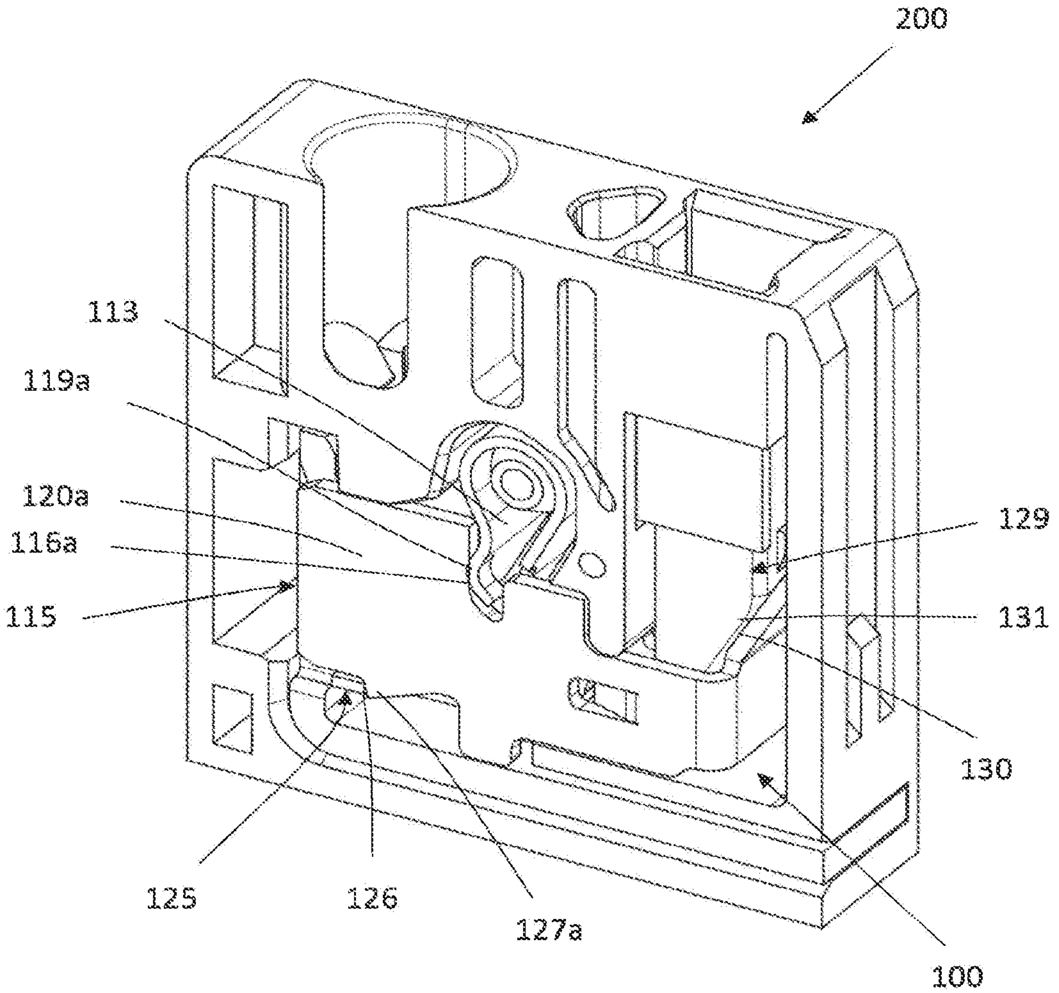
FIG. 3 is a schematic representation of the clamp terminal shown in FIG. 1 with the clamping leg of the clamping spring in a release position.
Figure 4:
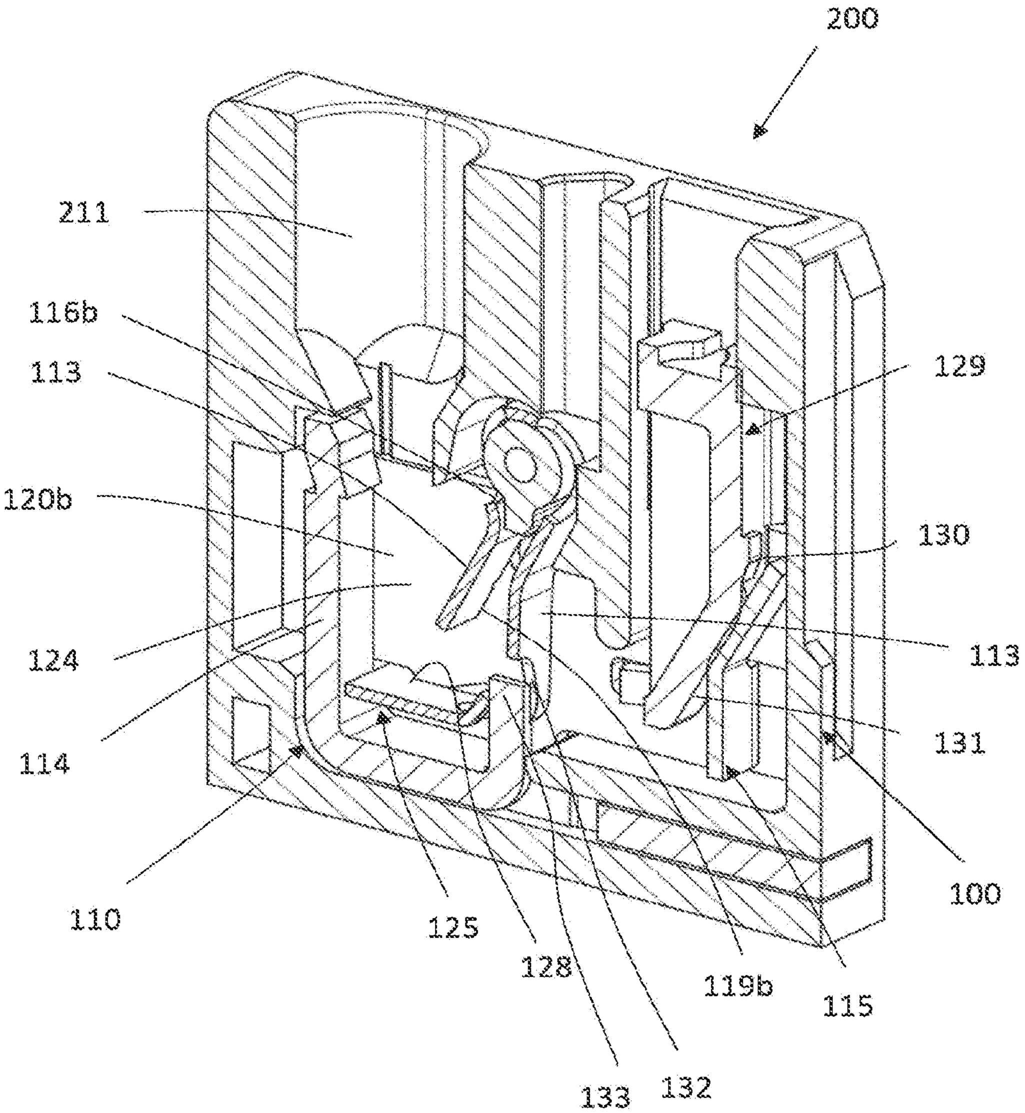
FIG. 4 is a schematic sectional representation of the clamp terminal shown in FIG. 3 with the connection arrangement according to the invention with the clamping leg of the clamping spring in the release position.

The connection arrangement 100 has a busbar 110 and a clamping spring 111 designed as a leg spring, as can be seen in particular also in the sectional representation in FIG. 2. The clamping spring 111 has a retaining leg 112 and a clamping leg 113. The retaining leg 112 is held in a fixed position, whereas the clamping leg 113 is pivotable relative to the retaining leg 112. By a pivoting movement of the clamping leg 113, the latter can be transferred into a clamping position, as shown in FIGS. 1 and 2, and into a release position, as shown in FIGS. 3 and 4. In the clamping position, the clamping leg 113 presses against a section 114 of the busbar 110 or against a conductor inserted into the connection arrangement 100, in order to clamp said conductor against the section 114 of the busbar 110 and connect the same. In the release position, the clamping leg 113 is positioned at a distance from the section 114 of the busbar 110 so that a conductor can be inserted into the free space thereby formed between the section 114 of the busbar 110 and the clamping leg 113.

Via its retaining leg 112, the clamping spring 111 is supported on the busbar 110. For this purpose, in the case of the embodiment shown in FIGS. 1 to 4, the retaining leg 112 has an opening 132 through which a part 133 of the busbar 110 projects so that the retaining leg 112 is attached to the busbar 110. The part 133 of the busbar 110 forms an end section of the busbar. The part 133 of the busbar 110 is formed in parallel to the section 114 of the busbar 110.

The connection arrangement 100 furthermore has a guide element 115. The guide element 115 is mounted displaceably in particular with respect to the busbar 110 so that the guide element 115 can perform a horizontal displacement movement V.

By means of the guide element 115, the clamping leg 113 of the clamping spring 111 can be transferred from the clamping position into the release position and held in the release position. For this purpose, the guide element 115 is operatively connected to the clamping leg 113 of the clamping spring 111.

In the embodiment shown here, the guide element 115 has two spring contact edges 116*a*, 116*b* which are arranged in parallel to one another and against which the clamping leg 113 rests.

The clamping leg 113 has a main section 117, on the free end of which a clamping edge 118 is formed. Two slide sections 119*a*, 119*b* are formed laterally in relation to the main section 117 so that the main section 117 is arranged between the two slide sections 119*a*, 119*b*. The two slide sections 119*a*, 119*b* rest against the two spring contact edges 116*a*, 116*b* of the guide element 115, wherein the slide section 119*a* rests against the spring contact edge 116*a* and the slide section 119*b* rests against the spring contact edge 116*b*. The slide sections 119*a*, 119*b* rest against the spring contact edges 116*a*, 116*b* both in the release position and in the clamping position of the clamping leg 113 of the clamping spring 111.

The slide sections 119*a*, 119*b* have a shorter length than the main section 117. The slide sections 119*a*, 119*b* are curved so that they form a skid shape, by means of which the slide sections 119*a*, 119*b* can slide along the spring contact edges 116*a*, 116*b* when the clamping leg 113 is being transferred into the release position and into the clamping position, as can be seen in particular in FIGS. 1 and 3.

The two spring contact edges 116*a*, 116*b* are formed on opposite longitudinal side walls 120*a*, 120*b* of the guide element 115. The two longitudinal side walls 120*a*, 120*b* are arranged in parallel to one another. The two longitudinal side walls 120*a*, 120*b* each have an upper edge 121*a*, 121*b* and an opposite lower edge 122*a*, 122*b*. The spring contact edges 116*a*, 116*b* each extend perpendicularly to the upper edge 121*a*, 121*b*. Starting from the horizontally extending upper edge 121*a*, 121*b*, the spring contact edges 116*a*, 116*b* extend downward in the direction of the horizontally extending lower edge 122*a*, 122*b* of the guide element 115.

The busbar 110 and the clamping spring 111 are arranged between the two longitudinal side walls 120*a*, 120*b* of the guide element 115. The busbar 110 and the clamping spring 111 are enclosed by the guide element 115.

The guide element 115 furthermore has two end walls 123*a*, 123*b* which are aligned in parallel to one another. The two end walls 123*a*, 123*b* are arranged transversely to the two longitudinal side walls 120*a*, 120*b* of the guide element 115.

A conductor connection space 124, into which a conductor to be connected can be inserted, is formed between the section 114 of the busbar 110 and the clamping leg 113. The conductor connection space 124 is laterally covered or delimited by the two longitudinal side walls 120*a*, 120*b* of the guide element 115 so that the guide element 115 also forms a guide for the conductor to be connected.

The conductor connection space 124 is formed flush with a conductor insertion opening 211 which is formed in the housing 210 and via which the conductor to be connected can be inserted into the housing 210 of the clamp terminal 200.

The connection arrangement 100 also has a release element 125. The release element 125 is arranged flush with the conductor insertion opening 211 and the conductor connection space 124. The release element 125 delimits the conductor connection space 124 downward.

In the release position of the clamping leg 113 of the clamping spring 111, the release element 125 is in engagement with the guide element 115, as can be seen in FIGS. 3 and 4, as a result of which the guide element 115 is held in its position and is thus also held in its position via the spring contact edges 116*a*, 116*b* and the slide sections 119*a*, 119*b* of the clamping legs 113 so that an undesired pivoting back of the clamping leg 113 from the release position into the clamping position can be prevented.

The release element 125 has two laterally arranged undercuts 126 which, in the release position of the clamping leg 113 of the clamping spring 111, are in engagement with a respective latching lug 127*a*, 127*b* of the guide element 115 in order to form a latching between the guide element 115 and the release element 125. The latching lug 127*a* is formed on the lower edge 122*a* of the longitudinal side wall 120*a*, and the latching lug 127*b* is formed on the lower edge 122*b* of the longitudinal side wall 120*b*.

In the clamping position, the release element 125 is out of engagement with the guide element 115, as can be seen in FIGS. 1 and 2, so that the guide element 115 is freely displaceable.

The release element 125 is mounted so as to be tiltable relative to the guide element 115.

When a conductor to be connected is inserted along the insertion direction E via the conductor insertion opening 211 into the conductor connection space 124, the conductor bumps against the release element 125, as a result of which the release element 125 is tilted relative to the guide element 115 and thereby comes out of engagement with the guide element 115, so that the guide element 115 can be freely displaced again, and the guide element 115 can thereby be displaced by the spring force of the clamping leg 113 alone, without manual assistance, in such a way that the clamping leg 113 can be transferred from the release position into the clamping position. The release element 125 has a pressure surface 128 which faces in the direction of the conductor connection space 124 and is arranged flush with the conductor insertion opening 211 or flush with the conductor connection space 124 so that the conductor bumps against the pressure surface 128 of the release element 125 when it is being inserted into the connection arrangement 100, as a result of which a compressive force is applied by the conductor to the release element 125. By applying a compressive force by means of the conductor to the pressure surface 128 and thus to the release element 125, the release element 125 can be brought into a pivoting movement or tilting movement in the direction of the insertion direction E of the conductor so that the release element 125 can be pivoted or tilted away from the guide element 115 in the insertion direction E of the conductor.

In the embodiment shown here, as can be seen in particular in FIG. 4, the release element 125 is connected to the retaining leg 112 of the clamping spring 111. The release element 125 is connected in such a way that the release element 125 is pivotable relative to the retaining leg 112, which remains in a fixed position. The pivot axis can be formed in the region of the connection of the release element 125 to the retaining leg 112.

When the guide element 115 is out of engagement with the release element 125, the displacement movement V of said guide element takes place in a direction that is oriented transversely to the insertion direction E of the conductor to be connected into the conductor connection space 124.

In order to transfer the clamping leg 113 against its spring force back from the clamping position into the release position by means of the guide element 115, the connection arrangement 100 has an actuating element 129. The actuating element 129 is mounted displaceably along an actuation direction B, wherein the actuation direction B is parallel to the insertion direction E of the conductor. The actuation direction B extends transversely to the displacement movement B of the guide element 115.

By means of the actuating element 129, the guide element 115 can be displaced in such a way that the clamping leg 113 of the clamping spring 111 resting against the guide element 115 can be transferred from the clamping position into the release position. When the actuating element 129 is actuated in the actuation direction B, the actuating element 129 can be displaced in such a way that it exerts a compressive force on the guide element 115 in order to displace the guide element 115 against the spring force of the clamping leg 113 of the clamping spring 115 in such a way that, when the release position of the clamping leg 113 is reached, the guide element 115 can come into engagement with the release element 125. This displacement movement V of the guide element 115 causes the clamping leg 113 to pivot from the clamping position into the release position.

The guide element 115 has a slide face 130 formed in the form of an inclined surface along which the actuating element 129 can be guided. In the embodiment shown here, the slide face 130 is formed on the end wall 123*b* of the guide element 115. The slide face 130 extends, starting from the end wall 123*b*, in the direction of the actuating element 129. By its formation as an inclined surface, the slide face 129 is arranged inclined so that the slide face 129 extends here at an angle between 130° and 160° to the end wall 123*b* of the guide element 115.

Alternatively, it would also be possible for the slide face 130 to be arranged at a distance from the end wall 123*b* between the two longitudinal side walls 120*a*, 120*b* so that the slide face 130 is directly connected to the longitudinal side walls 120*a*, 120*b*.

The actuating element 129 also has an inclined surface 131 formed corresponding to the inclination of the slide face 130. The inclined surface 131 of the actuating element 129 rests flat against the slide face 130 so that when the actuating element 129 is actuated in the actuation direction B, the inclined surface 131 can slide downward along the slide face 130 in order to displace the guide element 115. The inclination of the slide face 130 and also the inclination of the inclined surface 131 preferably have an angle between 30° and 50° to the actuation direction B of the actuating element 129.

The actuating element 129 is arranged adjacent to the retaining leg 112 of the clamping spring 111. The actuating element 129 is thus arranged behind the clamping spring 111. The clamping spring 111 is arranged between the section 114 of the busbar 110 and the actuating element 129.

Figure 5:
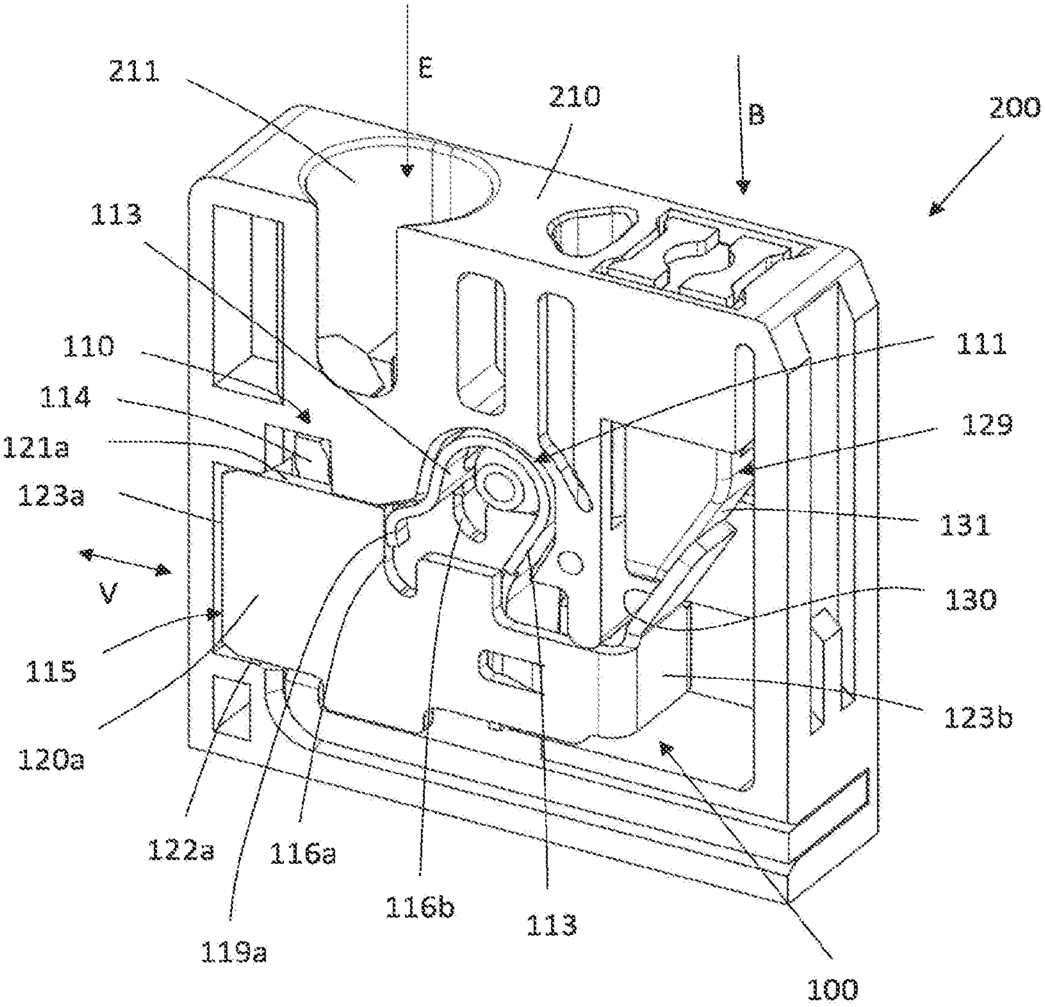
FIG. 5 is a schematic representation of a further clamp terminal with a connection arrangement according to the invention with the clamping leg of the clamping spring in a clamping position.
Figure 6:
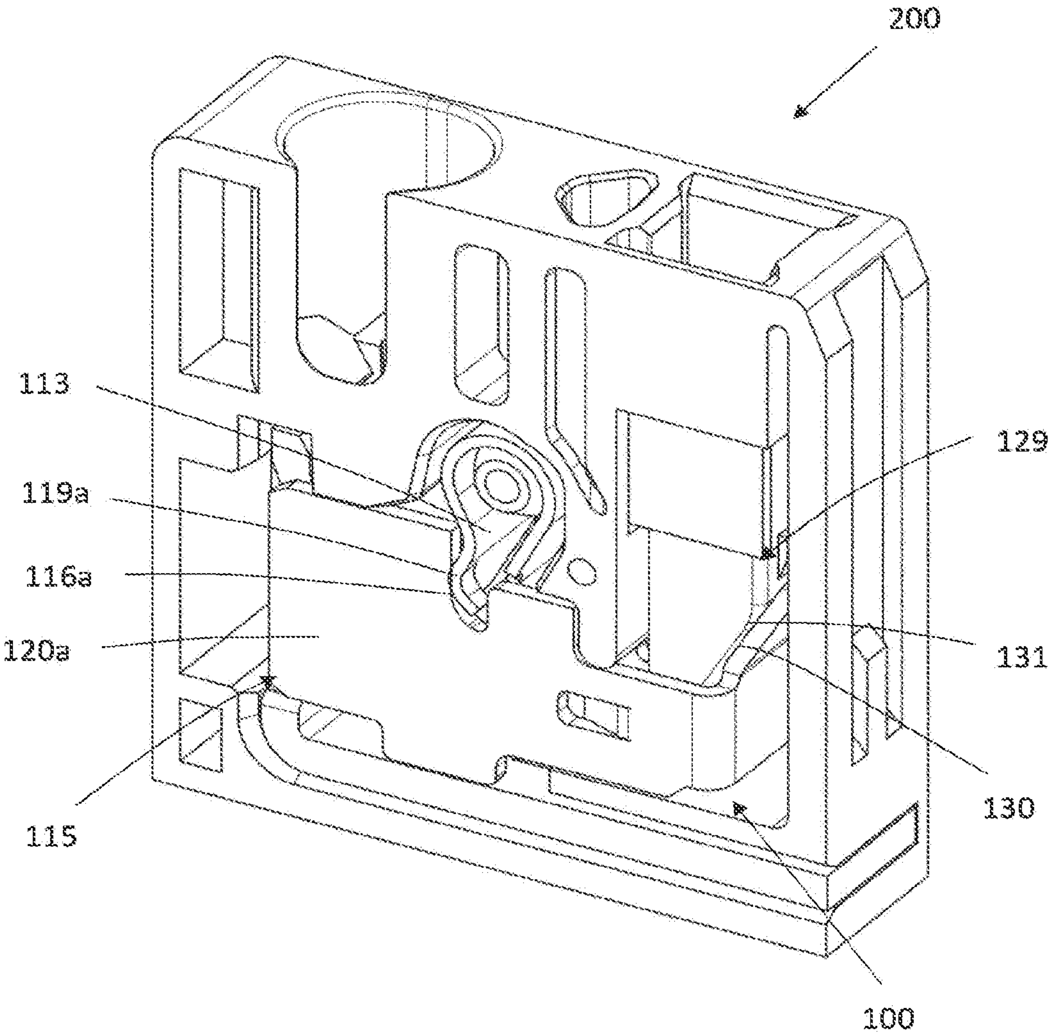
FIG. 6 is a schematic representation of the clamp terminal shown in FIG. 5 with the clamping leg of the clamping spring in a release position.
Figure 7:
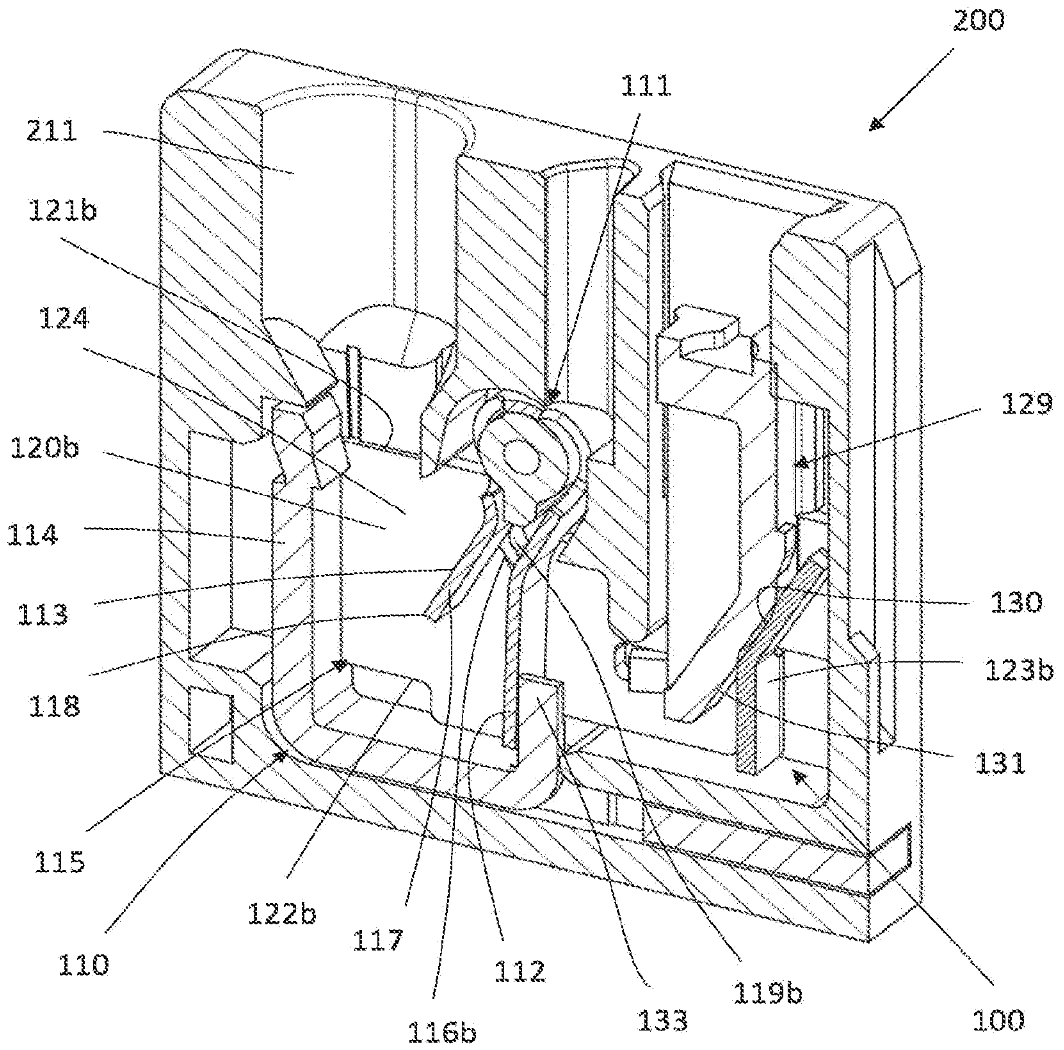
FIG. 7 is a schematic sectional representation of the clamp terminal shown in FIG. 6 with the connection arrangement according to the invention with the clamping leg of the clamping spring in the release position.

In the embodiment, shown in FIGS. 5 to 7, of a connection arrangement 100 of a clamp terminal 200, the clamping spring 111 is likewise arranged between the actuating element 129 and the section 114 of the busbar 110, against which a conductor can be clamped. The actuating element 129 is thus arranged at a distance from the conductor connection space 124. The clamping spring 111 is arranged between the conductor connection space 124 and the actuating element 129.

In the embodiment shown in FIGS. 5 to 7, the connection arrangement 100 has no release element 125 in contrast to the embodiment shown in FIGS. 1 to 4. The transfer of the clamping leg 113 from the clamping position into the release position in order to insert a conductor into the conductor connection space 124 can thus in the embodiment shown in FIGS. 5 to 7 take place by means of the actuating element 129 in that the latter slides with its surface 131 along the slide face 130 in the actuation direction B and the guide element 115 is thereby displaced, here to the right, in such a way that via the spring contact edges 116*a*, 116*b*, the clamping leg 113 is pulled via its slide sections 119*a*, 119*b* away from the section 114 of the busbar 110 so that the conductor connection space 124 becomes free and a conductor can be inserted into the conductor connection space 124.

In the embodiment shown in FIGS. 5 to 7, the retaining leg 112 of the clamping spring 111 is likewise supported on the busbar 110, in particular on the part 133 of the busbar 110, wherein the retaining leg 112 here rests with its end section flat against the part 133 of the busbar 110.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection arrangement
110 Busbar
111 Clamping spring
112 Retaining leg
113 Clamping leg
114 Section of the busbar
115 Guide element
116*a*, 116*b* Spring contact edge
117 Main section
118 Clamping edge
119*a*, 119*b* Slide section
120*a*, 120*a* Longitudinal side wall
121*a*, 121*b* Upper edge
122*a*, 122*b* Lower edge
123*a*, 123*b* End wall
124 Conductor connection space
125 Release element
126 Undercut
127*a*, 127*b* Latching lug
128 Pressure surface
129 Actuating element
130 Slide face
131 Inclined surface
132 Opening
133 Part of the busbar
200 Clamp terminal
210 Housing
211 Conductor insertion opening
V Displacement movement
E Insertion direction
B Actuation direction

The invention claimed is:

1. A connection arrangement for connecting an electrical conductor, comprising:

a busbar;

a clamping spring, which has a retaining leg and a clamping leg, the clamping leg being transferable into a clamping position and into a release position;

a conductor connection space formed between a section of the busbar and of the clamping leg of the clamping spring;

a displaceably arranged guide element, which is in operative connection with the clamping leg of the clamping spring, the clamping leg being holdable in the release position by the guide element; and an actuating element, by which the guide element is displaceable in order to transfer the clamping leg of the clamping spring from the clamping position into the release position, wherein the clamping spring is arranged between the section of the busbar and the actuating element, wherein the guide element has at least one spring contact edge against which the clamping leg rests, wherein the clamping leg has two slide sections each arranged laterally in relation to a main section having a clamping edge, wherein the guide element has two spring contact edges arranged at a distance from one another, and wherein a first slide section rests against a first spring contact edge and a second slide section rests against a second spring contact edge.

2. The connection arrangement of claim 1, wherein the guide element has a slide face along which the actuating element is guidable.

3. The connection arrangement of claim 2, wherein the guide element has two longitudinal side walls and two end walls arranged at right angles to the two longitudinal side walls, and wherein the slide face is arranged on one of the two end walls of the guide element.

4. The connection arrangement of claim 3, wherein, starting from an edge face of one of the two end walls, the slide face extends in a direction of the actuating element.

5. The connection arrangement of claim 3, wherein the guide element is displaceable such that a displacement movement of the guide element occurs transversely to an insertion direction of the conductor to be connected into the conductor connection space.

6. The connection arrangement of claim 5, wherein the two longitudinal side walls of the guide element in the insertion direction of the conductor are formed so long that the two longitudinal side walls delimit the conductor connection space on a first side and a second side opposite the first side.

7. The connection arrangement of claim 2, wherein the slide face forms an inclined surface, which is configured to interact with an inclined surface formed on the actuating element.

8. The connection arrangement of claim 1, wherein the clamping spring is supported via the retaining leg of the clamping spring on the busbar.

9. The connection arrangement of claim 1, further comprising:

a release element, which, in the release position of the clamping leg of the clamping spring, is in engagement with the guide element, wherein, during insertion of the conductor to be connected into the conductor connection space, the release element is actuatable by the conductor such that the release element is configured to come out of engagement with the guide element and the guide element is displaceable by a spring force of the clamping leg such that the clamping leg is transferred into the clamping position to clamp the conductor against the busbar.

10. The connection arrangement of claim 9, wherein the release element is mounted so as to be tiltable relative to the guide element.

11. The connection arrangement of claim 9, wherein the release element has at least one undercut, which, in the release position of the clamping leg of the clamping spring, is latched with at least one latching lug of the guide element.

12. The connection arrangement of claim 9, wherein the release element is connected to the retaining leg of the clamping spring.

13. A clamp terminal, comprising:

a housing in which at least one connection arrangement of claim 1 is arranged.

14. An electronic device, comprising:

at least one connection arrangement of claim 1.

15. An electronic device, comprising:

at least one clamp terminal of claim 4.

16. A connection arrangement for connecting an electrical conductor, comprising:

a busbar;

a clamping spring, which has a retaining leg and a clamping leg, the clamping leg being transferable into a clamping position and into a release position;

a conductor connection space formed between a section of the busbar and of the clamping leg of the clamping spring;

a displaceably arranged guide element, which is in operative connection with the clamping leg of the clamping spring, the clamping leg being holdable in the release position by the guide element; and an actuating element, by which the guide element is displaceable in order to transfer the clamping leg of the clamping spring from the clamping position into the release position, wherein the clamping spring is arranged between the section of the busbar and the actuating element, wherein the guide element has a slide face along which the actuating element is guidable, wherein the guide element has two longitudinal side walls and two end walls arranged at right angles to the two longitudinal side walls, wherein the slide face is arranged on one of the two end walls of the guide element, wherein the guide element is displaceable such that a displacement movement of the guide element occurs transversely to an insertion direction of the conductor to be connected into the conductor connection space, and wherein the two longitudinal side walls of the guide element in the insertion direction of the conductor are formed so long that the two longitudinal side walls delimit the conductor connection space on a first side and a second side opposite the first side.

17. A connection arrangement for connecting an electrical conductor, comprising:

a busbar;

a clamping spring, which has a retaining leg and a clamping leg, the clamping leg being transferable into a clamping position and into a release position;

a conductor connection space formed between a section of the busbar and of the clamping leg of the clamping spring;

a displaceably arranged guide element, which is in operative connection with the clamping leg of the clamping spring, the clamping leg being holdable in the release position by the guide element;

an actuating element, by which the guide element is displaceable in order to transfer the clamping leg of the clamping spring from the clamping position into the release position; and a release element, which, in the release position of the clamping leg of the clamping spring, is in engagement with the guide element, wherein the clamping spring is arranged between the section of the busbar and the actuating element, and wherein, during insertion of the conductor to be connected into the conductor connection space, the release element is actuatable by the conductor such that the release element is configured to come out of engagement with the guide element and the guide element is displaceable by a spring force of the clamping leg such that the clamping leg is transferred into the clamping position to clamp the conductor against the busbar.

18. The connection arrangement of claim 17, wherein the release element is mounted so as to be tiltable relative to the guide element.

* * * * *